(12) United States Patent
Meardi et al.

(10) Patent No.: US 12,309,408 B2
(45) Date of Patent: May 20, 2025

(54) EXCHANGING INFORMATION IN HIERARCHICAL VIDEO CODING

(71) Applicant: V-NOVA INTERNATIONAL LIMITED, London (GB)

(72) Inventors: Guido Meardi, London (GB); Ivan Damnjanovic, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 101 days.

(21) Appl. No.: 17/439,935

(22) PCT Filed: Apr. 16, 2020

(86) PCT No.: PCT/GB2020/050961
§ 371 (c)(1),
(2) Date: Sep. 16, 2021

(87) PCT Pub. No.: WO2020/212701
PCT Pub. Date: Oct. 22, 2020

(65) Prior Publication Data
US 2022/0182654 A1 Jun. 9, 2022

(30) Foreign Application Priority Data
Apr. 16, 2019 (GB) .................................... 1905400

(51) Int. Cl.
*H04N 19/46* (2014.01)
*H04N 19/124* (2014.01)
(Continued)

(52) U.S. Cl.
CPC ........... *H04N 19/46* (2014.11); *H04N 19/124* (2014.11); *H04N 19/136* (2014.11);
(Continued)

(58) Field of Classification Search
None
See application file for complete search history.

(56) References Cited

U.S. PATENT DOCUMENTS

2009/0141809 A1 6/2009 Msharam et al.
2014/0010294 A1 1/2014 Ye et al.
(Continued)

FOREIGN PATENT DOCUMENTS

CA 2763489 A1 7/2012
CN 101878649 A 11/2010
(Continued)

OTHER PUBLICATIONS

H. Schwarz et al: "Overview of the Scalable Video Coding Extension of the H.264/AVC Standard", IEEE Transactions on Circuits and Systems for Video Technology, vol. 17, No. 9, Sep. 1, 2007 (Sep. 1, 2007), pp. 1103-1120, XP055378169, US ISSN: 1051-8215, DOI: 10.1109/TCSVT.2007.905532.
International Search Report and Written Opinion for PCT/GB2020/050961 mailed Jul. 15, 2020.
Office Action received for Chinese Patent Application No. 202080028272.6, mailed on Sep. 30, 2024, 21 pages (13 pages of English Translation and 8 pages of Original Document).

*Primary Examiner* — Samuel D Fereja
(74) *Attorney, Agent, or Firm* — Workman Nydegger (57) ABSTRACT

According to an aspect of the invention there may be provided a method of encoding a stream of data, the method comprising: receiving an input signal; applying a first encoding operation on the input signal using a first codec to generate a first encoded stream; and, applying a second encoding operation on the input signal to generate a second encoded stream, wherein the first and second encoded streams are for combination at a decoder; and wherein the method further comprises exchanging information between the first encoding operation and the second encoding operation. A method of decoding, an encoder, decoder and computer readable medium are also provided.

17 Claims, 5 Drawing Sheets

(51) Int. Cl.
*H04N 19/136* (2014.01)
*H04N 19/187* (2014.01)
*H04N 19/33* (2014.01)
*H04N 19/423* (2014.01)

(52) U.S. Cl.
CPC ........... *H04N 19/187* (2014.11); *H04N 19/33* (2014.11); *H04N 19/423* (2014.11)

(56) References Cited

U.S. PATENT DOCUMENTS

| | | | |
|---|---|---|---|
| 2015/0092847 A1* | 4/2015 | Su | H04N 19/33 |
| | | | 375/240.12 |
| 2017/0223368 A1* | 8/2017 | Abbas | H04N 19/187 |
| 2019/0014363 A1* | 1/2019 | Skupin | H04N 21/234363 |
| 2019/0089958 A1* | 3/2019 | Nishi | H04N 19/70 |
| 2020/0045323 A1* | 2/2020 | Hannuksela | H04N 19/51 |
| 2021/0099707 A1 | 4/2021 | Rossato et al. | |

FOREIGN PATENT DOCUMENTS

| | | |
|---|---|---|
| CN | 104620581 A | 5/2015 |
| EP | 2479994 A1 | 7/2012 |
| EP | 2685738 | 1/2014 |
| GB | 2599508 | 4/2022 |
| KR | 2018-0058649 | 6/2018 |
| WO | 2012020092 | 2/2012 |
| WO | 2018/178507 A1 | 10/2018 |

\* cited by examiner

EXCHANGING INFORMATION IN HIERARCHICAL VIDEO CODING

CROSS-REFERENCE TO RELATED APPLICATIONS

The present application is a US § 371 Nationalization of PCT/GB2020/050961, filed Apr. 16, 2020, which claims priority to UK Application No. 1905400.6, filed Apr. 16, 2019. The disclosures of the aforementioned applications are incorporated by reference herein in their entireties.

BACKGROUND

Recent improvements in video coding technology have included the concept of hierarchical video coding. Examples include VC-6, undergoing standardisation at SMPTE as ST 2117, and LCEVC, undergoing standardisation at MPEG as MPEG-5 Part II. Typically, these hierarchical encoding schemes use multiple resolution levels and an encoder (or encoding module) associated with each resolution level.

Examples of hierarchical coding technology include patent publications WO 2013/171173, WO 2014/170819, WO 2018/046940 and WO2019/111004, the contents of which are incorporated herein by reference.

In these new coding schemes, efficiencies and optimisations are sought to reduce data size and/or processing requirements while improving picture quality of the ultimately reconstructed image.

SUMMARY OF THE INVENTION

According to a first aspect of the invention there may be provided a method of encoding a signal, the method comprising: receiving an input signal; applying a first encoding operation on the input signal using a first codec to generate a first encoded stream; and, applying a second encoding operation on the input signal to generate a second encoded stream, wherein the first and second encoded streams are for combination at a decoder; and wherein the method further comprises exchanging information between the first encoding operation and the second encoding operation. The exchange of useful information between coding operations allows for improvement in data quality following reconstruction, data reduction and/or processing efficiencies depending on the information exchanged. The signal may be a stream of data.

Preferably the method may further comprise adapting the first or second encoding operation or both, based on the information. Through such information exchange, the adaptation may be coordinated to improve overall efficiency or quality or providing a balance across coding operations. More preferably the first and second encoding operations may be encoding operations of a hierarchical coding scheme. Since each level of the hierarchy provides particular benefits or impacts, by adapting the parameters at each level, overall improvements can be made.

In certain examples the hierarchical coding scheme may comprise: producing a base encoded signal by feeding an encoder with a down-sampled version of an input signal; producing a first residual signal by: obtaining a decoded version of the base encoded signal; and using a difference between the decoded version of the base encoded signal and the down-sampled version of the input signal to produce the first residual signal; and, encoding the first residual signal to produce a first encoded residual signal. The method may further comprise: producing a second residual signal by: decoding the first encoded residual signal to produce a first decoded residual signal; correcting the decoded version of the base encoded signal using the first decoded residual signal to create a corrected decoded version; up-sampling the corrected decoded version; and using a difference between the up-sampled version and the input signal to produce the second residual signal; wherein the method further comprises: encoding the second residual signal to produce a second encoded residual signal, wherein the base encoded signal, the first encoded residual signal and the second encoded residual signal comprise an encoding of the input signal. The first encoding operation may be the encoder or the step of encoding the first residual signal. The second encoding operation may be the step of encoding the first residual signal or the step of encoding the second residual signal.

In certain other examples, the hierarchical coding scheme may comprise: producing a base encoded signal by feeding an encoder with a down-sampled version of an input signal, the down-sampled version having undergone one or more down-sampling operations; producing one or more residual signals by: up-sampling the output of each down-sampling operation to create one or more up-sampled signals; and using a difference between each up-sampled signal and the input to the respective down-sampling operation to produce the one or more residual signals; and, encoding the one or more residuals signals to produce one or more encoded residual signals. The first and second encoding operations may correspond to the steps of encoding any two of the one or more residual signals.

Alternatively, the hierarchical coding scheme may comprise: producing a base encoded signal by feeding an encoder with a down-sampled version of an input signal, the down-sampled version having undergone a plurality of sequential down-sampling operations; and producing an encoded first residual signal by: up-sampling the down-sampled version of the input signal; using a difference between the up-sampled version of the down-sampled version and the input to the last down-sampling operation of the plurality of sequential down-sampling operations to produce the first residual signal; and, encoding the first residual signal; producing a second residual signal by: up-sampling a summation of the first residual signal and the output of a preceding down-sampling operation to the last down-sampling operation of the plurality of sequential down-sampling operations; using a difference between the up-sampled summation and the input to the preceding down-sampling operation to produce the second residual signal; and, encoding the second residual signal. The first encoding operation may be the encoder or the step of encoding the first residual signal. The second encoding operation may be the step of encoding the first residual signal or the step of encoding the second residual signal.

According to a second aspect of the invention there may be provided a method of decoding a signal, the method comprising: receiving a first encoded signal and an second encoded signal; applying a first decoding operation to the first encoded signal to generate a first output signal; applying a second encoding operation on the second encoded signal to generate a second output signal; and, combining the first output signal and the second output signal to reconstruct an input signal, wherein the method further comprises exchanging information between the first decoding operation and the second decoding operation.

Preferably the method may further comprise adapting the first or second decoding operation or both based on the information. More preferably the first and second decoding operations may be decoding operations of a hierarchical coding scheme.

In certain examples, the hierarchical coding scheme may comprise: receiving a base encoded signal and instructing a decoding of the base encoded signal to produce a base decoded signal; receiving a first encoded residual signal and decoding the first encoded residual signal to produce a first decoded residual signal; correcting the base decoded signal using the first decoded residual signal to produce a corrected version of the base decoded signal; up-sampling the corrected version of the base decoded signal to produce an up-sampled signal; receiving a second encoded residual signal and decoding the second encoded residual signal to produce a second decoded residual signal; and combining the up-sampled signal with the second decoded residual signal to produce a reconstructed version of the input signal.

In certain examples, the first encoded signal and second encoded signal may comprise first and second component sets respectively, the first component set corresponding to a lower image resolution than the second component set, the method comprising: for each of the first and second component sets: decoding the component set so as to obtain a decoded set, the method further comprising: upscaling the decoded first component set so as to increase the corresponding image resolution of the decoded first component set to be equal to the corresponding image resolution of the decoded second component set, and combining the decoded first and second component sets together so as to produce a reconstructed set. The method may further comprise receiving one or more further component sets, wherein each of the one or more further component sets corresponds to a higher image resolution than the second component set, and wherein each of the one or more further component sets corresponds to a progressively higher image resolution, the method comprising, for each of the one or more further component sets, decoding the component set so as to obtain a decoded set, the method further comprising, for each of the one or more further component sets, in ascending order of corresponding image resolution: upscaling the reconstructed set having the highest corresponding image resolution so as to increase the corresponding image resolution of the reconstructed set to be equal to the corresponding image resolution of the further component set, and combining the reconstructed set and the further component set together so as to produce a further reconstructed set.

Optionally, the step of exchanging information may comprise sending information with metadata in a stream. Alternatively, the step of exchanging information may comprise embedding information in a stream. Further alternatively the step of exchanging information may comprise sending information using an Application Programming Interface (API). Further alternatively the step of exchanging information may comprise sending a pointer to a shared memory space. The step of exchanging information may also comprise exchanging information using supplemental enhancement information (SEI).

The information exchanged may comprise encoding or decoding parameters for modifying the encoding or decoding operations, respectively.

The information exchanged may comprise one or more selected from a group comprising: user input information; metadata describing content of the input video; host device information; content analysis information; perceptual information describing the areas of the image where coding artefacts will be less visible considering Human Visual System (HVS); motion information; complexity of the frame to be encoded; frame entropy; estimated required number of bits; frame information; decisions taken during encoding or decoding; a type of prediction used for a frame to be decoded/encoded; a quantisation level used for a frame to be decoded/encoded, decisions made per group of pixels; statistics information; objective video quality metrics; and, rate control information.

The signal may a video and the step of exchanging information may be performed on a per video, per group of pictures, per segment, per picture, per group of pixels or per pixel basis.

According to a further aspect of the invention there may be provided a method of encoding a stream of data, the method may comprise: receiving an input video; applying a base encoding operation on the input video using a base codec to generate a base encoded stream; applying a further encoding operation on the input video to generate an enhancement stream; exchanging information between the base encoding operation and the further encoding operation.

According to a further aspect of the invention there may be provided a method of decoding a stream of data, the method may comprise: receiving a base encoded stream of data and an enhancement stream of data; applying a base decoding operation on the base encoded stream to generate a first output video; applying a further encoding operation on the enhanced stream of data to generate a set of residuals; and, combining the first output video and the set of residuals to reconstruct an input video, wherein the method further comprises: exchanging information between the base decoding operation and the further decoding operation.

According to a further aspect there may be provided an apparatus for encoding a data set into an encoded data set comprising a header and a payload. The apparatus configured to encode an input video according to the above steps. The apparatus may comprise a processor configured to carry out the method of any of the above aspects.

According to a further aspect there may be provided an apparatus for decoding a data set into a reconstructed video from a data set comprising a header and a payload. The apparatus configured to decode an output video according to the above steps. The apparatus may comprise a processor configured to carry out the method of any of the above aspects.

An encoding apparatus and decoding apparatus may also be provided.

According to further aspects of the invention there may be provided computer readable media which when executed by a processor cause the processor to perform any of the methods of the above aspects.

DETAILED DESCRIPTION

The present invention relates to methods. In particular, the present invention relates to methods for encoding and decoding signals. Processing data may include, but is not limited to, obtaining, deriving, outputting, receiving and reconstructing data. The present invention relates to the exchange of useful information between two (or more encoders) that are encoding the same content (or parts of it or representations of it), be it in the form of joint modules, or modules that are realised in one of the encoders but generate the information that might be useful for the others. Similarly, each of the concepts described herein apply also to the decoder stage where multiple decoding stages may exchange information with one another.

In preferred examples, the encoders or decoders are part of a hierarchical coding scheme. In more preferred examples, the encoders or decoders utilise technology incorporated in VC-6 or LCEVC coding schemes although the concepts illustrated herein are not limited to these specific hierarchical coding schemes.

Figure 1:
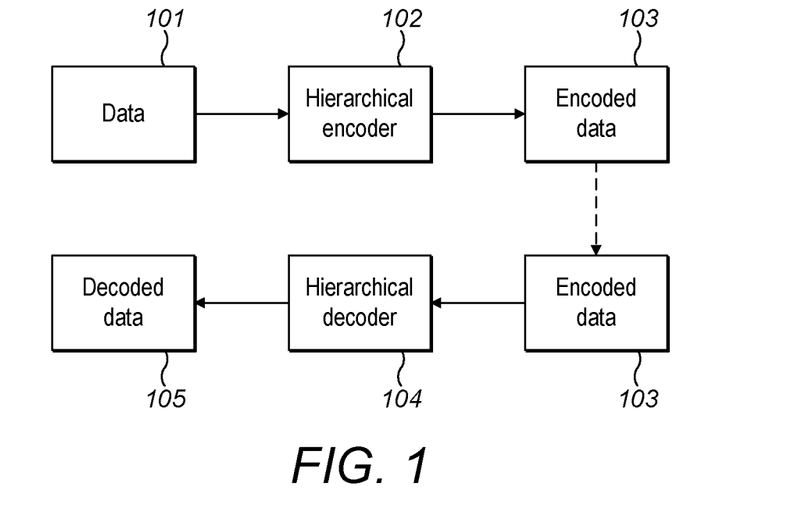
FIG. 1 shows a high-level schematic of an hierarchical encoding and decoding process.

FIG. 1 illustrates, very generally, a hierarchical coding scheme. Data to be encoded 101 is retrieved by a hierarchical encoder 102 which outputs encoded data 103. Subsequently, the encoded data 103 is received by a hierarchical decoder 104 which decodes the data and outputs decoded data 105.

Typically, the hierarchical coding schemes used in examples herein create a base or core level, which is a representation of the original data at a lower level of quality and one or more levels of residuals which can be used to recreate the original data at a higher level of quality using a decoded version of the base level data. In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame.

It should be noted that the generalised examples are agnostic as to the nature of the input signal. Reference to "residual data" as used herein refers to data derived from a set of residuals, e.g. a set of residuals themselves or an output of a set of data processing operations that are performed on the set of residuals. Throughout the present description, generally a set of residuals includes a plurality of residuals or residual elements, each residual or residual element corresponding to a signal element, that is, an element of the signal or original data.

In specific examples the data may be an image or video. In these examples, the set of residuals corresponds to an image or frame of the video, with each residual being associated with a pixel of the signal, the pixel being the signal element.

The methods described herein may be applied to so-called planes of data that reflect different colour components of a video signal. For example, the methods may be applied to different planes of YUV or RGB data reflecting different colour channels. Different colour channels may be processed in parallel. The components of each stream may be collated in any logical order.

A hierarchical coding scheme will now be described in which the concepts of the invention may be deployed. The scheme is conceptually illustrated in FIGS. 2 to 5 and corresponds generally to VC-6 described above. In such encoding techniques, residuals data is used in progressively higher levels of quality. In this proposed technique, a core layer represents the image at a first resolution and subsequent layers in the tiered hierarchy are residual data or adjustment layers necessary for the decoding side to reconstruct the image at a higher resolution. Each layer or level may be referred to as an echelon index, such that the residuals data is data required to correct low quality information present in a lower echelon index. Each layer or echelon index in this hierarchical technique, particularly each residual layer, is often a comparatively sparse data set having many zero value elements.

When reference is made to an echelon index, it refers collectively to all echelons or sets of components at that level, for example, all subsets arising from a transform step performed at that level of quality.

In this particular hierarchical manner, the described data structure removes any requirement for, or dependency on, the preceding or proceeding level of quality. A level of quality may be encoded and decoded separately, and without reference to any other layer. Thus, in contrast to many known other hierarchical encoding schemes, where there is a requirement to decode the lowest level of quality in order to decode any higher levels of quality, the described methodology does not require the decoding of any other layer. Nevertheless, the principles of exchanging information described below may also be applicable to other hierarchical coding schemes.

Figure 2:
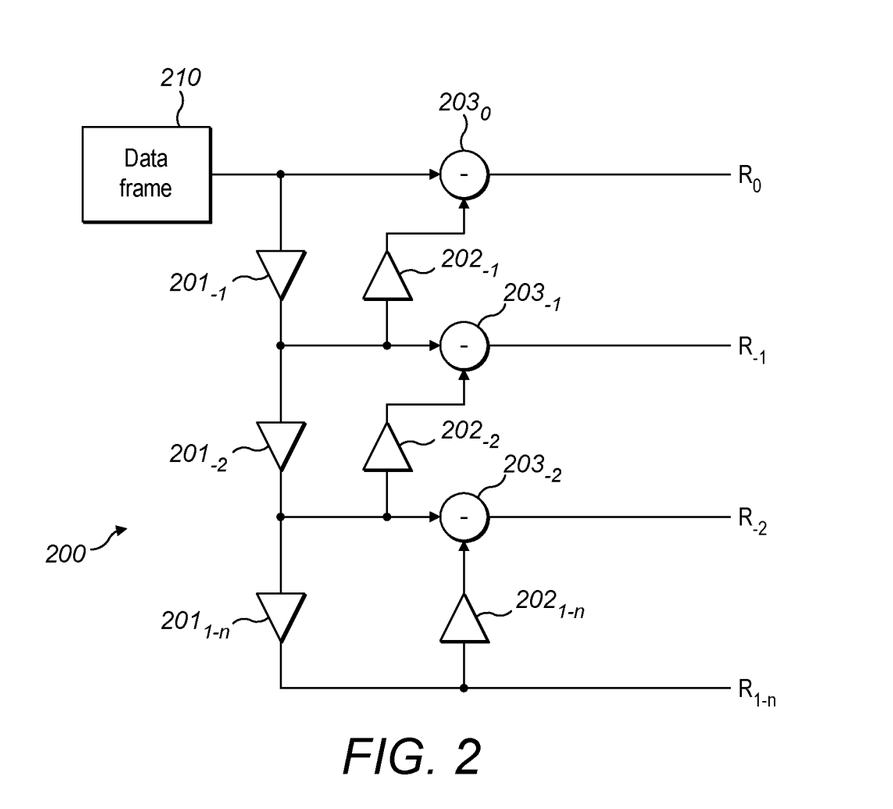
FIG. 2 shows a high-level schematic of a hierarchical deconstruction process.

As shown in FIG. 2, the encoded data represents a set of layers or levels, referred to here generally as echelon indices. The base or core level represents the original data frame 210, albeit at the lowest level of quality or resolution and the subsequent residuals data echelons can combine with the data at the core-echelon index to recreate the original image at progressively higher resolutions.

To create the core-echelon index, an input data frame 210 may be down-sampled using a number of down-sampling operations 201 corresponding to the number of levels or echelon indices to be used in the hierarchical coding operation. One fewer down-sampling operation 201 is required than the number of levels in the hierarchy. In all examples illustrated herein, there are 4 levels or echelon indices of output encoded data and accordingly 3 down-sampling operations, but it will of course be understood that these are merely for illustration. Where n indicates the number of levels, the number of down-samplers is n−1. The core level $R_{1-n}$ is the output of the third down-sampling operation. As indicated above, the core level $R_{1-n}$ corresponds to a representation of the input data frame at a lowest level of quality.

To distinguish between down-sampling operations 201, each will be referred to in the order in which the operation is performed on the input data 210 or by the data which its output represents. For example, the third down-sampling operation $201_{1-n}$ in the example may also be referred to as the core down-sampler as its output generates the core-echelon index or $echelon_{1-n}$, that is, the index of all echelons at this level is 1-n. Thus, in this example, the first down-sampling operation $201_{-1}$ corresponds to the R-1 down-sampler, the second down-sampling operation $201_{-2}$ corresponds to the R-2 down-sampler and the third down-sampling operation $201_{1-n}$ corresponds to the core or R-3 down-sampler.

As shown in FIG. 2, the data representing the core level of quality $R_{1-n}$ undergoes an up-sampling operation $202_{1-n}$, referred to here as the core up-sampler. A difference 203_ between the output of the second down-sampling operation $201_{-2}$ (the output of the R-2 down-sampler, i.e. the input to the core down-sampler) and the output of the core up-sampler $202_{1-n}$ is output as the first residuals data $R_{-2}$. This first residuals data $R_{-2}$ is accordingly representative of the error between the core level $R_{-3}$ and the signal that was used to create that level. Since that signal has itself undergone two down-sampling operations in this example, the first residuals data $R_{-2}$ is an adjustment layer which can be used to recreate the original signal at a higher level of quality than the core level of quality but a lower level than the input data frame 210.

Figure 3:
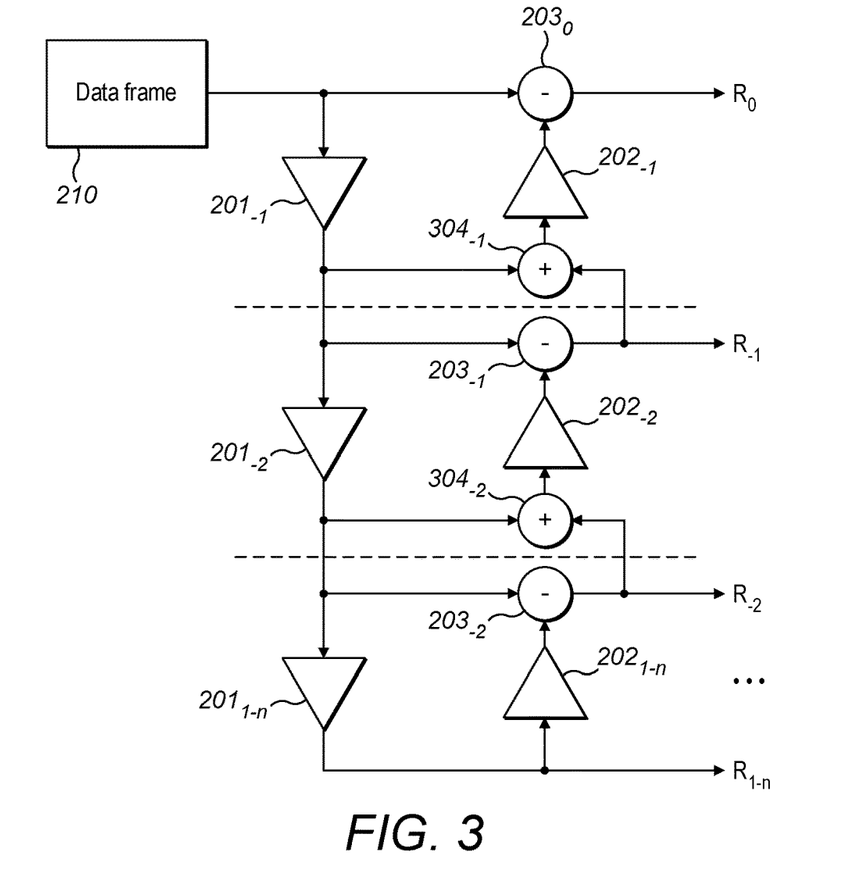
FIG. 3 shows an alternative high-level schematic of a hierarchical deconstruction process.

Variations in how to create residuals data representing higher levels of quality are conceptually illustrated in FIGS. 2 and 3.

In FIG. 2, the output of the second down-sampling operation $201_{-2}$ (or R-2 down-sampler, i.e. the signal used to create the first residuals data $R_{-2}$), is up-sampled $202_{-2}$ and the difference $203_{-1}$ between the input to the second down-sampling operation $201_{-2}$ (or R-2 down-sampler, i.e. the output of the R-1 down-sampler) is calculated in much the same way as the first residuals data $R_{-2}$ is created. This difference is accordingly the second residuals data $R_{-1}$ and represents an adjustment layer which can be used to recreate the original signal at a higher level of quality using the data from the lower layers.

In the variation of FIG. 3, however, the output of the second down-sampling operation $201_{-2}$ (or R-2 down-sampler) is combined or summed $304_{-2}$ with the first residuals data $R_{-2}$ to recreate the output of the core up-sampler $202_{1-n}$. In this variation it is this recreated data which is up-sampled $202_{-2}$ rather than the down-sampled data. The up-sampled data is similarly compared $203_{-1}$ to the input to the second down-sampling operation (or R-2 down-sampler, i.e. the output of the R-1 down-sampler) to create the second residuals data $R_{-1}$.

The variation between the implementations of FIGS. 2 and 3 results in slight variations in the residuals data between the two implementations. FIG. 2 benefits from greater potential for parallelisation.

The process or cycle repeats to create the third residuals $R_0$. In the examples of FIGS. 2 and 3, the output residuals data $R_0$ (i.e. the third residuals data) corresponds to the highest level and is used at the decoder to recreate the input data frame. At this level the difference operation is based on the input data frame which is the same as the input to the first down-sampling operation.

Figure 4:
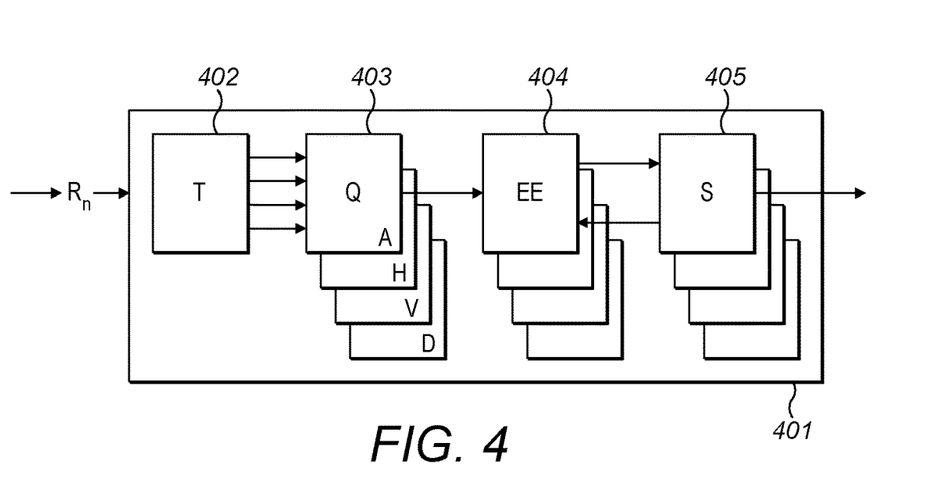
FIG. 4 shows a high-level schematic of an encoding process suitable for encoding the residuals of tiered outputs.

FIG. 4 illustrates an example encoding process 401 for encoding each of the levels or echelon indices of data to produce a set of encoded echelons of data having an echelon index. This encoding process is used merely for example of a suitable encoding process for encoding each of the levels, but it will be understood that any suitable encoding process may be used. The input to the process is a respective level of residuals data output from FIG. 2 or 3 and the output is a set of echelons of encoded residuals data, the echelons of encoded residuals data together hierarchically represent the encoded data.

In a first step, a transform 402 is performed. The transform may be directional decomposition transform as described in WO2013/171173 or a wavelet or discrete cosine transform. If a directional decomposition transform is used, there may be output a set of four components. When reference is made to an echelon index, it refers collectively to all directions (A, H, V, D), i.e., 4 echelons. The component set is then quantized 403 before entropy encoding. In this example, the entropy encoding operation 404 is coupled to a sparsification step 405 which takes advantage of the sparseness of the residuals data to reduce the overall data size and involves mapping data elements to an ordered quadtree. Such coupling of entropy coding and sparsification is described further in WO2019/111004 but the precise details of such a process is not relevant to the understanding of the invention. Each array of residuals e may be thought of as an echelon.

The process set out above corresponds to an encoding process suitable for encoding data for reconstruction according to SMPTE ST 2117, VC-6 Multiplanar Picture Format. VC-6 is a flexible, multi-resolution, intra-only bitstream format, capable of compressing any ordered set of integer element grids, each of independent size but is also designed for picture compression. It employs data agnostic techniques for compression and is capable of compressing low or high bit-depth pictures. The bitstream's headers can contain a variety of metadata about the picture.

As will be understood, each echelon or echelon index may be implemented using a separate encoder or encoding operation. Similarly, an encoding module may be divided into the steps of down-sampling and comparing, to produce the residuals data, and subsequently encoding the residuals or alternatively each of the steps of the echelon may be implemented in a combined encoding module. Thus, the process may be for example be implemented using 4 encoders, one for each echelon index, 1 encoder and a plurality of encoding modules operating in parallel or series, or one encoder operating on different data sets repeatedly.

The following sets out an example of reconstructing an original data frame, the data frame having been encoded using the above exemplary process. This reconstruction process may be referred to as pyramidal reconstruction. Advantageously, the method provides an efficient technique for reconstructing an image encoded in a received set of data, which may be received by way of a data stream, for example, by way of individually decoding different component sets corresponding to different image size or resolution levels, and combining the image detail from one decoded component set with the upscaled decoded image data from a lower-resolution component set. Thus by performing this process for two or more component sets, digital images at the structure or detail therein may be reconstructed for progressively higher resolutions or greater numbers of pixels, without requiring the full or complete image detail of the highest-resolution component set to be received. Rather, the method facilitates the progressive addition of increasingly higher-resolution details while reconstructing an image from a lower-resolution component set, in a staged manner.

Moreover, the decoding of each component set separately facilitates the parallel processing of received component sets, thus improving reconstruction speed and efficiency in implementations wherein a plurality of processes is available.

Each resolution level corresponds to a level of quality or echelon index. This is a collective term, associated with a plane (in this example a representation of a grid of integer value elements) that describes all new inputs or received component sets, and the output reconstructed image for a cycle of index-m. The reconstructed image in echelon index zero, for instance, is the output of the final cycle of pyramidal reconstruction.

Pyramidal reconstruction may be a process of reconstructing an inverted pyramid starting from the initial echelon index and using cycles by new residuals to derive higher echelon indices up to the maximum quality, quality zero, at echelon index zero. A cycle may be thought of as a step in such pyramidal reconstruction, the step being identified by an index-m. The step typically comprises up-sampling data output from a possible previous step, for instance, upscaling the decoded first component set, and takes new residual data as further inputs in order to obtain output data to be up-sampled in a possible following step. Where only first and second component sets are received, the number of echelon indices will be two, and no possible following step is present. However, in examples where the number of component sets, or echelon indices, is three or greater, then the output data may be progressively up-sampled in the following steps.

The first component set typically corresponds to the initial echelon index, which may be denoted by echelon index 1-N, where N is the number of echelon indices in the plane.

Typically, the upscaling of the decoded first component set comprises applying an up-sampler to the output of the decoding procedure for the initial echelon index. In examples, this involves bringing the resolution of a reconstructed picture output from the decoding of the initial echelon index component set into conformity with the resolution of the second component set, corresponding to 2-N. Typically, the upscaled output from the lower echelon index component set corresponds to a predicted image at the higher echelon index resolution. Owing to the lower-resolution initial echelon index image and the up-sampling process, the predicted image typically corresponds to a smoothed or blurred picture.

Adding to this predicted picture higher-resolution details from the echelon index above provides a combined, reconstructed image set. Advantageously, where the received component sets for one or more higher-echelon index component sets comprise residual image data, or data indicating the pixel value differences between upscaled predicted pictures and original, uncompressed, or pre-encoding images, the amount of received data required in order to reconstruct an image or data set of a given resolution or quality may be considerably less than the amount or rate of data that would be required in order to receive the same quality image using other techniques. Thus, by combining low-detail image data received at lower resolutions with progressively greater-detail image data received at increasingly higher resolutions in accordance with the method, data rate requirements are reduced.

Typically, the set of encoded data comprises one or more further component sets, wherein each of the one or more further component sets corresponds to a higher image resolution than the second component set, and wherein each of the one or more further component sets corresponds to a progressively higher image resolution, the method comprising, for each of the one or more further component sets, decoding the component set so as to obtain a decoded set, the method further comprising, for each of the one or more further component sets, in ascending order of corresponding image resolution: upscaling the reconstructed set having the highest corresponding image resolution so as to increase the corresponding image resolution of the reconstructed set to be equal to the corresponding image resolution of the further component set, and combining the reconstructed set and the further component set together so as to produce a further reconstructed set.

In this way, the method may involve taking the reconstructed image output of a given component set level or echelon index, upscaling that reconstructed set, and combining it with the decoded output of the component set or echelon index above, to produce a new, higher resolution reconstructed picture. It will be understood that this may be performed repeatedly, for progressively higher echelon indices, depending on the total number of component sets in the received set.

In typical examples, each of the component sets corresponds to a progressively higher image resolution, wherein each progressively higher image resolution corresponds to a factor-of-four increase in the number of pixels in a corresponding image. Typically, therefore, the image size corresponding to a given component set is four times the size or number of pixels, or double the height and double the width, of the image corresponding to the component set below, that is the component set with the echelon index one less than the echelon index in question. A received set of component sets in which the linear size of each corresponding image is double with respect to the image size below may facilitate more simple upscaling operations, for example.

In the illustrated example, the number of further component sets is two. Thus, the total number of component sets in the received set is four. This corresponds to the initial echelon index being echelon-3.

The first component set may correspond to image data, and the second and any further component sets correspond to residual image data. As noted above, the method provides particularly advantageous data rate requirement reductions for a given image size in cases where the lowest echelon index, that is the first component set, contains a low resolution, or down sampled, version of the image being transmitted. In this way, with each cycle of reconstruction, starting with a low resolution image, that image is upscaled so as to produce a high resolution albeit smoothed version, and that image is then improved by way of adding the differences between that upscaled predicted picture and the actual image to be transmitted at that resolution, and this additive improvement may be repeated for each cycle. Therefore, each component set above that of the initial echelon index needs only contain residual data in order to reintroduce the information that may have been lost in down sampling the original image to the lowest echelon index.

The method provides a way of obtaining image data, which may be residual data, upon receipt of a set containing data that has been compressed, for example, by way of decomposition, quantization, entropy-encoding, and sparsification, for instance.

The sparsification step is particularly advantageous when used in connection with sets for which the original or pre-transmission data was sparse, which may typically correspond to residual image data. A residual may be a difference between elements of a first image and elements of a second image, typically co-located. Such residual image data may typically have a high degree of sparseness. This may be thought of as corresponding to an image wherein areas of detail are sparsely distributed amongst areas in which details are minimal, negligible, or absent. Such sparse data may be described as an array of data wherein the data are organised in at least a two-dimensional structure (e.g. a grid), and wherein a large portion of the data so organised are zero (logically or numerically) or are considered to be below a certain threshold. Residual data are just one example. Additionally, metadata may be sparse and so be reduced in size to a significant degree by this process. Sending data that has been sparsified allows a significant reduction in required data rate to be achieved by way of omitting to send such sparse areas, and instead reintroducing them at appropriate locations within a received byteset at a decoder.

Typically, the entropy-decoding, de-quantizing, and directional composition transform steps are performed in accordance with parameters defined by an encoder or a node from which the received set of encoded data is sent. For each echelon index, or component set, the steps serve to decode image data so as to arrive at a set which may be combined with different echelon indices as per the technique disclosed above, while allowing the set for each level to be transmitted in a data-efficient manner.

There may also be provided a method of reconstructing a set of encoded data according to the method disclosed above, wherein the decoding of each of the first and second component sets is performed according to the method disclosed above. Thus, the advantageous decoding method of the present disclosure may be utilised for each component set or echelon index in a received set of image data and reconstructed accordingly.

Figure 5:
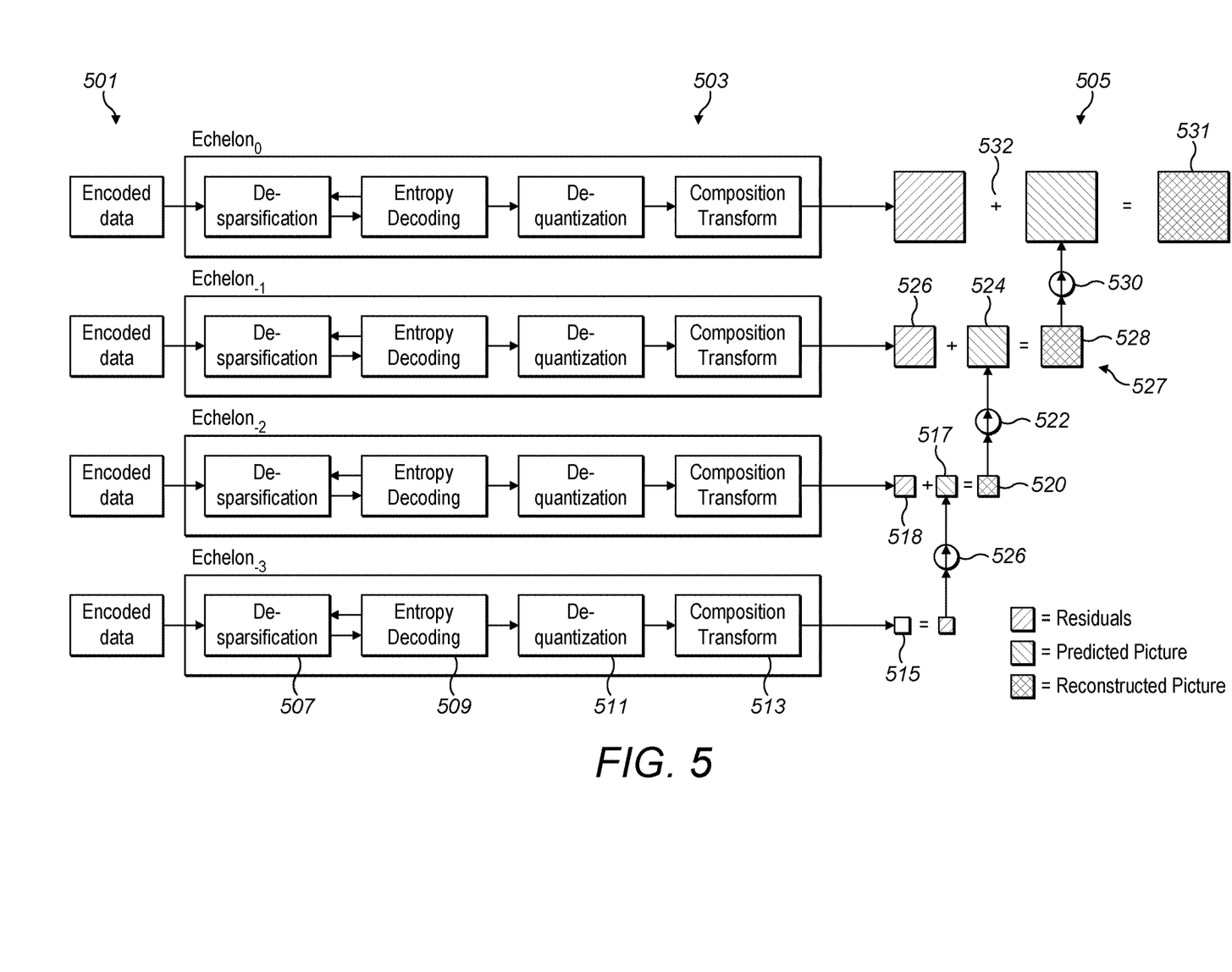
FIG. 5 shows a high-level schematic of a hierarchical decoding process suitable for decoding each output level from FIG. 4.

With reference to FIG. 5, a decoding example is now described. A set of encoded data 501 is received, wherein the set comprises four echelon indices, each echelon index comprising four echelons: from echelon0, the highest resolution or level of quality, to echelon-3, the initial echelon. The image data carried in the echelon-3 component set corresponds to image data, and the other component sets contain residual data for that transmitted image. While each of the levels may output data that can be considered as residuals, the residuals in the initial echelon level, that is echelon-3, effectively correspond to the actual reconstructed image. At stage 503, each of the component sets is processed in parallel so as to decode that encoded set.

With reference to the initial echelon index, or the core-echelon index, the following decoding steps are carried out for each component set echelon-3 to echelon0.

At step 507, the component set is de-sparsified. In this way, the de-sparsification causes a sparse two-dimensional array to be recreated from the encoded byteset received at each echelon. Zero values grouped at locations within the two-dimensional array which were not received (owing to there being omitted from the transmitted byteset in order to reduce the quantity of data transmitted) are repopulated by this process. Non-zero values in the array retain their correct values and positions within the recreated two-dimensional array, with the de-sparsification step repopulating the transmitted zero values at the appropriate locations or groups of locations there between.

At step 509, a range decoder, the configured parameters of which correspond to those using which the transmitted data was encoded prior to transmission, is applied to the de-sparsified set at each echelon in order to substitute the encoded symbols within the array with pixel values. The encoded symbols in the received set are substituted for pixel values in accordance with an approximation of the pixel value distribution for the image. The use of an approximation of the distribution, that is relative frequency of each value across all pixel values in the image, rather than the true distribution, permits a reduction in the amount of data required to decode the set, since the distribution information is required by the range decoder in order to carry out this step. As described in the present disclosure, the steps of de-sparsification and range decoding are interdependent, rather than sequential. This is indicated by the loop formed by the arrows in the flow diagram.

At step 511, the array of values is de-quantized. This process is again carried out in accordance with the parameters with which the decomposed image was quantized prior to transmission.

Following de-quantization, the set is transformed at step 513 by a composition transform which comprises applying an inverse directional decomposition operation to the de-quantized array. This causes the directional filtering, according to a 2×2 operator comprising average, horizontal, vertical, and diagonal operators, to be reversed, such that the resultant array is image data for echelon-3 and residual data for echelon-2 to echelon0.

Stage 505 illustrates the several cycles involved in the reconstruction utilising the output of the composition transform for each of the echelon component sets 501.

Stage 515 indicates the reconstructed image data output from the decoder 503 for the initial echelon. In an example, the reconstructed picture 515 has a resolution of 64×64. At 516 this reconstructed picture is up-sampled so as to increase its constituent number of pixels by a factor of four, thereby a predicted picture 517 having a resolution of 128×128 is produced. At stage 520 the predicted picture 517 is added to the decoded residuals 518 from the output of the decoder at echelon-2. The addition of these two 128×128-size images produces a 128×128-size reconstructed image, containing the smoothed image detail from the initial echelon enhanced by the higher-resolution detail of the residuals from echelon-2. This resultant reconstructed picture 519 may be output or displayed if the required output resolution is that corresponding to echelon-2. In the present example, the reconstructed picture 519 is used for a further cycle.

At step 512, the reconstructed image 519 is up-sampled in the same manner as at step 516, so as to produce a 256×256-size predicted picture 524. This is then combined at step 528 with the decoded echelon-1 output 526, thereby producing a 256×256-size reconstructed picture 527 which is an upscaled version of prediction 519 enhanced with the higher-resolution details of residuals 526. At 530 this process is repeated a final time, and the reconstructed picture 527 is upscaled to a resolution of 512×512, for combination with the echelon0 residual at stage 532. Thereby a 512×512 reconstructed picture 531 is obtained.

Figure 6:
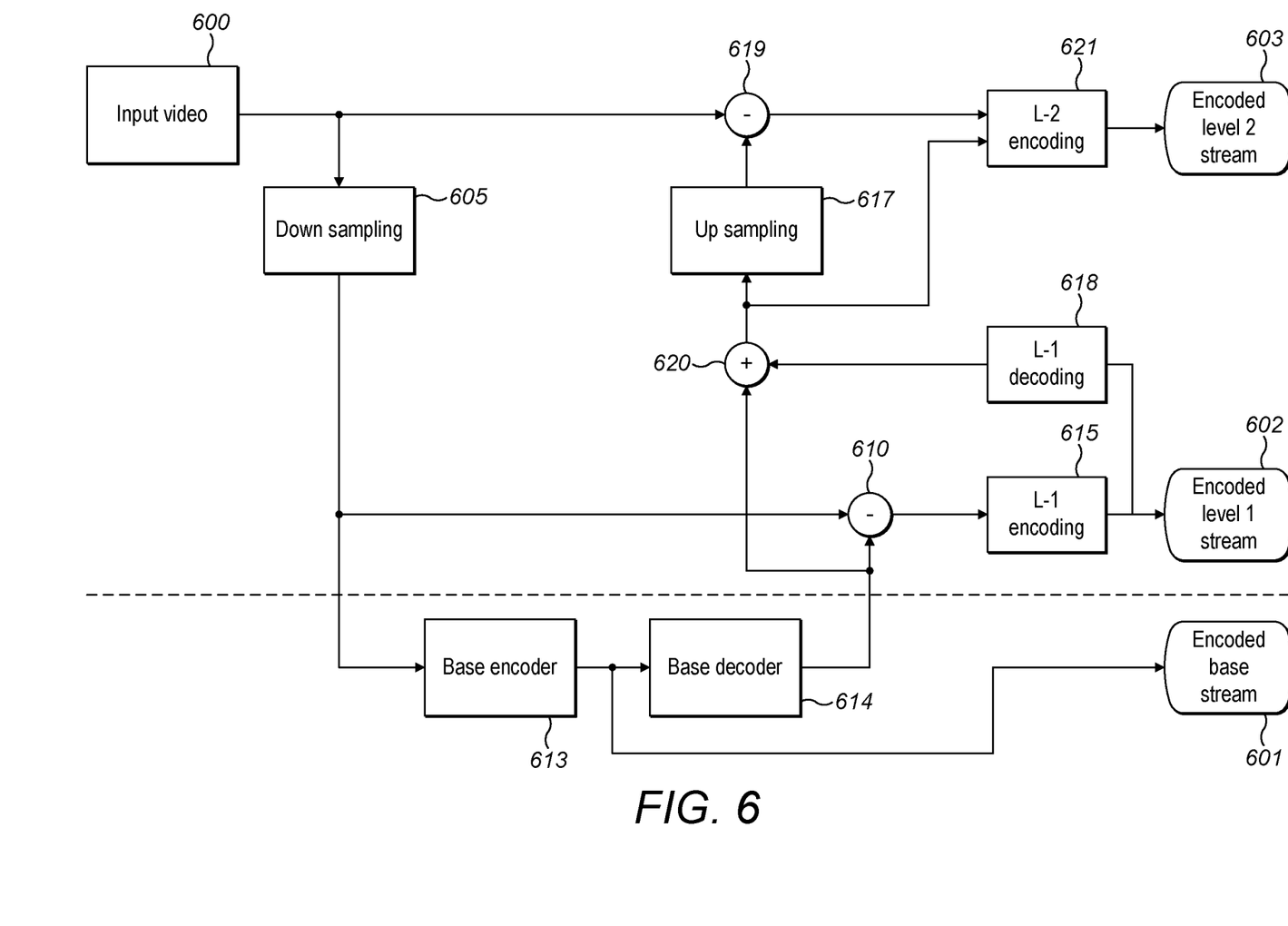
FIG. 6 shows a high-level schematic of an encoding process of a hierarchical coding technology; and, FIG. 7 shows a high-level schematic of a decoding process suitable for decoding the output of FIG. 6.
Figure 7:
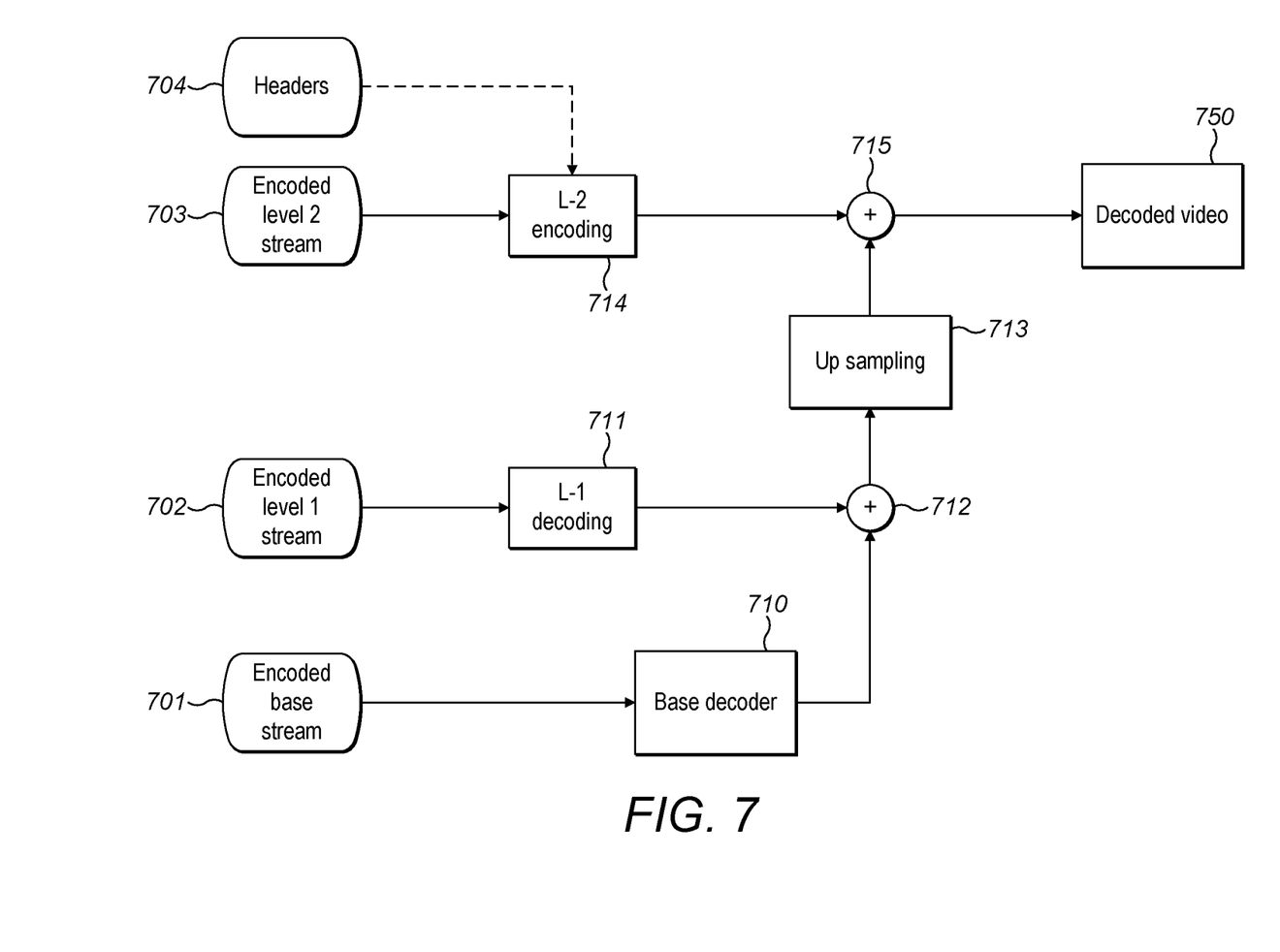

A further hierarchical coding technology with which the principles of the present invention may be utilised is illustrated in FIGS. 6 and 7. This technology is a flexible, adaptable, highly efficient and computationally inexpensive coding format which combines a different video coding format, a base codec, (e.g. AVC, HEVC, or any other present or future codec) with at least two enhancement levels of coded data.

The general structure of the encoding scheme uses a down-sampled source signal encoded with a base codec, adds a first level of correction data to the decoded output of the base codec to generate a corrected picture, and then adds a further level of enhancement data to an up-sampled version of the corrected picture.

Thus, the streams are considered to be a base stream and an enhancement stream. It is worth noting that typically the base stream is expected to be decodable by a hardware decoder while the enhancement stream is expected to be suitable for software processing implementation with suitable power consumption.

This structure creates a plurality of degrees of freedom that allow great flexibility and adaptability to many situations, thus making the coding format suitable for many use cases including OTT transmission, live streaming, live UHD broadcast, and so on.

Although the decoded output of the base codec is not intended for viewing, it is a fully decoded video at a lower resolution, making the output compatible with existing decoders and, where considered suitable, also usable as a lower resolution output.

In this example, and other contemplated examples, in general, each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied. In this way, the enhancement can be synchronised to the base stream and the frames of each bitstream combined to produce the decoded output video (i.e. the residuals of each frame of enhancement level are combined with the frame of the base decoded stream). A group of pictures may represent multiple NALUs.

Returning to the initial process described above, where a base stream is provided along with two levels (or sub-levels) of enhancement within an enhancement stream, an example of a generalised encoding process is depicted in the block diagram of FIG. 6. An input full resolution video 600 is processed to generate various encoded streams 601, 602, 603. A first encoded stream (encoded base stream) is produced by feeding a base codec (e.g., AVC, HEVC, or any other codec) with a down-sampled version of the input video. The encoded base stream may be referred to as the base layer or base level. A second encoded stream (encoded level 1 stream) is produced by processing the residuals obtained by taking the difference between a reconstructed base codec video and the down-sampled version of the input video. A third encoded stream (encoded level 2 stream) is produced by processing the residuals obtained by taking the difference between an up-sampled version of a corrected version of the reconstructed base coded video and the input video. In certain cases, the components of FIG. 6 may provide a general low complexity encoder. In certain cases, the enhancement streams may be generated by encoding processes that form part of the low complexity encoder and the low complexity encoder may be configured to control an independent base encoder and decoder (e.g. as packaged as a base codec). In other cases, the base encoder and decoder may be supplied as part of the low complexity encoder. In one case, the low complexity encoder of FIG. 6 may be seen as a form of wrapper for the base codec, where the functionality of the base codec may be hidden from an entity implementing the low complexity encoder.

A down-sampling operation illustrated by down-sampling component 105 may be applied to the input video to produce a down-sampled video to be encoded by a base encoder 613 of a base codec. The down-sampling can be done either in both vertical and horizontal directions, or alternatively only in the horizontal direction. The base encoder 613 and a base decoder 614 may be implemented by a base codec (e.g. as different functions of a common codec). The base codec, and/or one or more of the base encoder 613 and the base decoder 614 may comprise suitably configured electronic circuitry (e.g. a hardware encoder/decoder) and/or computer program code that is executed by a processor.

Each enhancement stream encoding process may not necessarily include an up-sampling step. In FIG. 6 for example, the first enhancement stream is conceptually a correction stream while the second enhancement stream is up-sampled to provide a level of enhancement.

Looking at the process of generating the enhancement streams in more detail, to generate the encoded Level 1 stream, the encoded base stream is decoded by the base decoder 614 (i.e. a decoding operation is applied to the encoded base stream to generate a decoded base stream). Decoding may be performed by a decoding function or mode of a base codec. The difference between the decoded base stream and the down-sampled input video is then created at a level 1 comparator 610 (i.e. a subtraction operation is applied to the down-sampled input video and the decoded base stream to generate a first set of residuals). The output of the comparator 610 may be referred to as a first set of residuals, e.g. a surface or frame of residual data, where a residual value is determined for each picture element at the resolution of the base encoder 613, the base decoder 614 and the output of the down-sampling block 605.

The difference is then encoded by a first encoder 615 (i.e. a level 1 encoder) to generate the encoded Level 1 stream 602 (i.e. an encoding operation is applied to the first set of residuals to generate a first enhancement stream).

As noted above, the enhancement stream may comprise a first level of enhancement 602 and a second level of enhancement 603. The first level of enhancement 602 may be considered to be a corrected stream, e.g. a stream that provides a level of correction to the base encoded/decoded video signal at a lower resolution than the input video 600. The second level of enhancement 603 may be considered to be a further level of enhancement that converts the corrected stream to the original input video 600, e.g. that applies a level of enhancement or correction to a signal that is reconstructed from the corrected stream.

In the example of FIG. 6, the second level of enhancement 603 is created by encoding a further set of residuals. The further set of residuals are generated by a level 2 comparator 619. The level 2 comparator 619 determines a difference between an up-sampled version of a decoded level 1 stream, e.g. the output of an up-sampling component 617, and the input video 600. The input to the up-sampling component 617 is generated by applying a first decoder (i.e. a level 1 decoder) to the output of the first encoder 615. This generates a decoded set of level 1 residuals. These are then combined with the output of the base decoder 614 at summation component 620. This effectively applies the level 1 residuals to the output of the base decoder 614. It allows for losses in the level 1 encoding and decoding process to be corrected by the level 2 residuals. The output of summation component 620 may be seen as a simulated signal that represents an output of applying level 1 processing to the encoded base stream 601 and the encoded level 1 stream 602 at a decoder.

As noted, an up-sampled stream is compared to the input video which creates a further set of residuals (i.e. a difference operation is applied to the up-sampled re-created stream to generate a further set of residuals). The further set of residuals are then encoded by a second encoder 621 (i.e. a level 2 encoder) as the encoded level 2 enhancement stream (i.e. an encoding operation is then applied to the further set of residuals to generate an encoded further enhancement stream).

Thus, as illustrated in FIG. 6 and described above, the output of the encoding process is a base stream 601 and one or more enhancement streams 602, 603 which preferably comprise a first level of enhancement and a further level of enhancement. The three streams 601, 602 and 603 may be combined, with or without additional information such as control headers, to generate a combined stream for the video encoding framework that represents the input video 600. It should be noted that the components shown in FIG. 6 may operate on blocks or coding units of data, e.g. corresponding to 2×2 or 4×4 portions of a frame at a particular level of resolution. The components operate without any inter-block dependencies, hence they may be applied in parallel to multiple blocks or coding units within a frame. This differs from comparative video encoding schemes wherein there are dependencies between blocks (e.g. either spatial dependencies or temporal dependencies). The dependencies of comparative video encoding schemes limit the level of parallelism and require a much higher complexity.

A corresponding generalised decoding process is depicted in the block diagram of FIG. 7. FIG. 7 may be said to show a low complexity decoder that corresponds to the low complexity encoder of FIG. 6. The low complexity decoder receives the three streams 601, 602, 603 generated by the low complexity encoder together with headers 704 containing further decoding information. The encoded base stream 601 is decoded by a base decoder 710 corresponding to the base codec used in the low complexity encoder. The encoded level 1 stream 602 is received by a first decoder 711 (i.e. a level 1 decoder), which decodes a first set of residuals as encoded by the first encoder 615 of FIG. 1. At a first summation component 712, the output of the base decoder 710 is combined with the decoded residuals obtained from the first decoder 711. The combined video, which may be said to be a level 1 reconstructed video signal, is up-sampled by up-sampling component 713. The encoded level 2 stream 103 is received by a second decoder 714 (i.e. a level 2 decoder). The second decoder 714 decodes a second set of residuals as encoded by the second encoder 621 of FIG. 1. Although the headers 704 are shown in FIG. 7 as being used by the second decoder 714, they may also be used by the first decoder 711 as well as the base decoder 710. The output of the second decoder 714 is a second set of decoded residuals. These may be at a higher resolution to the first set of residuals and the input to the up-sampling component 713. At a second summation component 715, the second set of residuals from the second decoder 714 are combined with the output of the up-sampling component 713, i.e. an up-sampled reconstructed level 1 signal, to reconstruct decoded video 750.

As per the low complexity encoder, the low complexity decoder of FIG. 7 may operate in parallel on different blocks or coding units of a given frame of the video signal. Additionally, decoding by two or more of the base decoder 710, the first decoder 711 and the second decoder 714 may be performed in parallel. This is possible as there are no inter-block dependencies.

In the decoding process, the decoder may parse the headers 704 (which may contain global configuration information, picture or frame configuration information, and data block configuration information) and configure the low complexity decoder based on those headers. In order to re-create the input video, the low complexity decoder may decode each of the base stream, the first enhancement stream and the further or second enhancement stream. The frames of the stream may be synchronised and then combined to derive the decoded video 750. The decoded video 750 may be a lossy or lossless reconstruction of the original input video 100 depending on the configuration of the low complexity encoder and decoder. In many cases, the decoded video 750 may be a lossy reconstruction of the original input video 600 where the losses have a reduced or minimal effect on the perception of the decoded video 750.

In each of FIGS. 6 and 7, the level 2 and level 1 encoding operations may include the steps of transformation, quantization and entropy encoding (e.g. in that order). It may also include residual ranking, weighting and filtering. Similarly, at the decoding stage, the residuals may be passed through an entropy decoder, a de-quantizer and an inverse transform module (e.g. in that order). Any suitable encoding and corresponding decoding operation may be used. Preferably however, the level 2 and level 1 encoding steps may be performed in software (e.g. as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications PCT/EP2013/059847 or PCT/GB2017/052632, which are incorporated herein by reference. The encoder may select between different transforms to be used, for example between a size of kernel to be applied.

The transform may transform the residual information to four surfaces. For example, the transform may produce the following components: average, vertical, horizontal and diagonal. As alluded to earlier in this disclosure, these components that are output by the transform may be taken in such embodiments as the coefficients to be quantized in accordance with the described methods.

A quantization scheme may be useful to create the residual signals into quanta, so that certain variables can assume only certain discrete magnitudes.

Entropy encoding in this example may comprise run length encoding (RLE), then processing the encoded output is processed using a Huffman encoder. In certain cases, only one of these schemes may be used when entropy encoding is desirable.

In summary, the methods and apparatuses herein are based on an overall approach which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding approach. The idea behind the overall approach of the examples is to hierarchically encode/decode the video frame as opposed to the use block-based approaches as used in the MPEG family of algorithms.

Hierarchically encoding a frame includes generating residuals for the full frame, and then a decimated frame and so on.

The video compression residual data for the full-sized video frame may be referred to as LoQ-2 (e.g. 1920×1080 for an HD video frame or higher for a UHD frame), while that of the decimated frame may be referred to as LoQ-x, where x denotes a number corresponding to a hierarchical decimation. In the described examples of FIGS. 1 and 2, the variable x may have values of 1 and 2 represent the first and second enhancement streams. Hence there are 2 hierarchical levels for which compression residuals will be generated. Other naming schemes for the levels may also be applied without any change in functionality (e.g. the level 1 and level 2 enhancement streams described herein may alternatively be referred to as level 1 and level 2 streams—representing a count down from the highest resolution).

As indicated above, the processes may be applied in parallel to coding units or blocks of a colour component of a frame as there are no inter-block dependencies. The encoding of each colour component within a set of colour components may also be performed in parallel (e.g. such that the operations are duplicated according to (number of frames)*(number of colour components)*(number of coding units per frame)). It should also be noted that different colour components may have a different number of coding units per frame, e.g. a luma (e.g. Y) component may be processed at a higher resolution than a set of chroma (e.g. U or V) components as human vision may detect lightness changes more than colour changes.

Thus, as illustrated and described above, the output of the decoding process is an (optional) base reconstruction, and an original signal reconstruction at a higher level. This example is particularly well-suited to creating encoded and decoded video at different frame resolutions. For example, the input signal 30 may be an HD video signal comprising frames at 1920×1080 resolution. In certain cases, the base reconstruction and the level 2 reconstruction may both be used by a display device. For example, in cases of network traffic, the level 2 stream may be disrupted more than the level 1 and base streams (as it may contain up to 4× the amount of data where down-sampling reduces the dimensionality in each direction by 2). In this case, when traffic occurs the display device may revert to displaying the base reconstruction while the level 2 stream is disrupted (e.g. while a level 2 reconstruction is unavailable), and then return to displaying the level 2 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 2 reconstruction.

The encoding arrangement also enables video distributors to distribute video to a set of heterogeneous devices; those with just a base decoder 720 view the base reconstruction, whereas those with the enhancement level may view a higher-quality level 2 reconstruction. In comparative cases, two full video streams at separate resolutions were required to service both sets of devices. As the level 2 and level 1 enhancement streams encode residual data, the level 2 and level 1 enhancement streams may be more efficiently encoded, e.g. distributions of residual data typically have much of their mass around 0 (i.e. where there is no difference) and typically take on a small range of values about 0. This may be particularly the case following quantization. In contrast, full video streams at different resolutions will have different distributions with a non-zero mean or median that require a higher bit rate for transmission to the decoder.

In the examples described herein residuals are encoded by an encoding pipeline. This may include transformation, quantization and entropy encoding operations. It may also include residual ranking, weighting and filtering. Residuals are then transmitted to a decoder, e.g. as L-1 and L-2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g. high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given pixel or area and the resultant residual value is zero. When looking at the distribution of residuals much of the probability mass is allocated to small residual values located near zero—e.g. for certain videos values of −2, −1, 0, 1, 2 etc. occur the most frequently. In certain cases, the distribution of residual values is symmetric or near symmetric about 0. In certain test video cases, the distribution of residual values was found to take a shape similar to logarithmic or exponential distributions (e.g. symmetrically or near symmetrically) about 0. The exact distribution of residual values may depend on the content of the input video stream.

Residuals may be treated as a two-dimensional image in themselves, e.g. a delta image of differences. Seen in this manner the sparsity of the data may be seen to relate features like "dots", small "lines", "edges", "corners", etc. that are visible in the residual images. It has been found that these features are typically not fully correlated (e.g. in space and/or in time). They have characteristics that differ from the characteristics of the image data they are derived from (e.g. pixel characteristics of the original video signal).

As the characteristics of residuals differ from the characteristics of the image data they are derived from it is generally not possible to apply standard encoding approaches, e.g. such as those found in traditional Moving Picture Experts Group (MPEG) encoding and decoding standards. For example, many comparative schemes use large transforms (e.g. transforms of large areas of pixels in a normal video frame). Due to the characteristics of residuals, e.g. as described above, it would be very inefficient to use these comparative large transforms on residual images. For example, it would be very hard to encode a small dot in a residual image using a large block designed for an area of a normal image.

Certain examples described herein address these issues by instead using small and simple transform kernels (e.g. 2×2 or 4×4 kernels—the Directional Decomposition and the Directional Decomposition Squared—as presented herein). The transform described herein may be applied using a Hadamard matrix (e.g. a 4×4 matrix for a flattened 2×2 coding block or a 16×16 matrix for a flattened 4×4 coding block). This moves in a different direction from comparative video encoding approaches. Applying these new approaches to blocks of residuals generates compression efficiency. For example, certain transforms generate uncorrelated coefficients (e.g. in space) that may be efficiently compressed. While correlations between coefficients may be exploited, e.g. for lines in residual images, these can lead to encoding complexity, which is difficult to implement on legacy and low-resource devices, and often generates other complex artefacts that need to be corrected. Pre-processing residuals by setting certain residual values to 0 (i.e. not forwarding these for processing) may provide a controllable and flexible way to manage bitrates and stream bandwidths, as well as resource use.

Exchanging Information

As noted above, the present invention considers the principle of exchange of useful information between two (or more encoders) that are encoding the same content (or parts of it), be it in the form of joint modules, or modules that are realised in one of the encoders but generate the information that might be useful for the others. For example, the encoders may be the base encoder and enhancement level encoders of the architecture of FIG. 6 or the encoders for each echelon or echelon index (or residuals level of quality) of FIG. 3.

It will of course be understood that there are various possible mechanisms to exchange information between multiple encoders or decoders.

In an example, information can be passed in the form of data structures using a common API or as a pointer to a memory location in a shared memory space where it is stored. Further, information may be exchanged between the two encoder or decoder modules via supplemental enhancement information, SEI, (https://mpeg.chiariglione.org/tags/sei-messages, accessed 16 Apr. 2019). Another mechanism may be as a metadata in the bitstream, or passed via API.

Depending on how the information (above as modules for example) are realised, the level of integration of the encoders, the latency allowed, or storage and memory bandwidth; this information can be passed per group of pictures, per picture, per group of pixels or per pixel. Similarly, in the example of FIG. 3 the information may be passed per echelon, per echelon index, per plane or per image.

Based on the information exchanged between encoders or decoders, each encoder or decoder may adapt coding parameters to improve the coding operation. Through such information exchange, the adaption may be coordinated to improve overall efficiency or quality and providing a balance across levels or layers of the hierarchy. It can be seen that each level of the hierarchy provides particular benefits and so by balancing the parameters at each level, overall improvements can be made.

In an example implementation using the principles of FIG. 6, although equally applicable to the echelons of FIG. 3, a base encoder is doing a job first and sends info to the enhancement encoder, so that the enhancement encoder can adapt to it. Similarly, the enhancement encoder may send feedback information to the base encoder, so it can adapt its parameters for the next frame. For example, at an enhancement encoder, although a quantization level on the correction layer was set quite high, the enhancement encoder spent too many bits on correction, so it might signal it. The base encoder might decide to lower its quantisation level or to apply less aggressive perceptual optimisation in response.

In a further example, where a base encoder operates on an input video and an enhancement layer takes the output of the base encoder and operates on the output (in combination with the input video, for example by up-sampling or reconstructing the video and creating a set of residuals), the base encoder may include messages in the stream picked up by the enhancement layer or may send separate messages to the enhancement layer allowing the enhancement layer to act (i.e. the messages include the information or pointers to the information). The messages may also include information allowing the enhancement to sync the information exchanged with the stream/frame, etc. depending on the granularity of the information.

The following provides examples of the information that may be exchanged between multiple encoding or decoding operations.

In a first example, a user may input information which may be exchanged by the encoders, such as information exchanged about the type of the content. For example if the data encoded represents is live sports content, it can be expected that there will be lots of temporal activity and in that sense it be determined to give more bits to the base encoder as lower frequency artefacts will be more visible. In another example, if content contains graphics, high frequencies become more important and more bits could be given to the enhancement layer. Such coordination between layers provides for improved quality at the reconstruction.

In certain examples, a user may insert the information to be exchanged via a user interface. This information is received by either an overall controller that than sends it to the base and enhancement encoder/decoder at the same time, or the whole encoder can be controlled by the base encoder, in which case information is passed from base encoder to enhancement layer.

In another example, where an encoder includes multiple enhancement layers, for example, a correction and enhancement layer, if content is temporally demanding and it can be determined that the base layer might struggle, it can be decided to put more bits in the correction layer, especially if high frequency details are less visible in fast moving content. Otherwise, if there are lots of graphics, it can be decided to allocate more bits to the enhancement layer to preserve more high frequency details.

Information gathered from the host device may also be exchanged or passed between encoders. Examples include device camera, motion sensors, temperature sensors etc. This information can be very useful for setting both base and enhancement encoders. Processing of this information can be realised as a separate module that then passes information to encoders or can be already realised in one of the encoders and in that case host encoder can pass the information to the enhancement encoder.

Content analysis modules can also be used to provide the information to be exchanged. Various pre-processing modules can be present to analyse the pictures to be encoded either as a separate module or as an integral part of the one of the encoders. Examples include: perceptual information describing the areas of the image where coding artefacts will be less visible considering Human Visual System (HVS); motion information, including temporal activity of the frame, per group of pixels (blocks) information, such as motion estimation in the form of motion vectors or per pixel information (e.g. optical flow); and, any other information in any other form about estimated complexity of the frame to be encoded, its entropy, estimated required number of bits etc.

In a further example, the information exchanged between encoders may include encoding decisions taken by any one of the encoders. Encoders can pass any information about decisions they made during encoding process to each other. This might include the type of prediction used for the frame (I, P or B frames in h264 or self-contained, frames predicted from previously displayed frame or frames that predicted from both previous and following frames). The decisions may also include a quantisation level used for the frame or decisions made per group of pixels (motion vectors, quantisation steps used, mode decisions etc). This information can be highly beneficial to the encoder receiving information as it can be used for example to decide how many bits to use for correcting errors of the base encoder and how much for enhancement, what type of up-sampler to use, and/or how to spread bit budget spatially.

In a final example, the information exchanged between the encoders may include statistics about the encoded content. Encoders can exchange any information gathered about a group of pictures, pictures, a group of pixels or pixels that they have already encoded. For example, how many bits has been spent per picture in a particular group of pictures can aid a decision in a rate control module of the encoder receiving the information. In another statistics example, objective video quality metrics calculated in one of the encoders can help other encoder in bit budgeting decisions and in estimation of the final picture quality. Any statistics on the modes per group of pixels used (intra or inter encoded) can be used to aid the decisions on prediction modes to be used in the encoder receiving information.

As indicated above, the information exchanged between encoders may be exchanged at different levels of granularity. For example: information regarding the whole video; information per group of pictures, i.e. segment of the video to be encoded; information about a picture to be encoded; information about group of pixels (blocks, tiles of pixels) to be encoded; and/or information per pixel.

The chosen granularity may provide particular benefits, for example, useful information could be exchanged to help in giving more bits to specific parts of the image. Where the information exchanged is from a device camera it may represent focusing and exposure information, telling us which parts of the image contain details. Modern cameras also have depth of field information. This information can be used to provide detail in areas of the image. Additionally, algorithms that might be implemented either in camera or base encoder can provide useful information to be exchanged. For example, face detection, region of interest extraction and background extractions can all be useful to understand which details are important and which are not, and in that way can help in deciding where to put more bits. Thus, the encoders (and their parameters) can be adapted based on the algorithms used and information passed between levels of the hierarchy. Coordination between the levels can be provided by shared information even if the information from the algorithm is not itself shared but rather information based on adaptions provided or to be provided.

Depending how encoders have been implemented (dedicated hardware, software on CPU, GPU) and resources available (memory management, processing speed etc), different type of exchange of information will be able to be exchanged. For example, if shared memory is limited and one encoder is implemented in hardware and another in software, information might not be able to be exchanged for any per pixel or even per group of pixel information, but statistics per picture could be gathered that will be easier to pass from one encoder to another. Sending statistics instead of raw per pixel information is one way of solving these challenges. While there may be less precision, in many cases it might be enough.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programmed Graphical Processing Unit (GPU) or a specifically designed Field Programmable Gate Array (FPGA) may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The invention claimed is:

1. A method of encoding a signal, the method comprising:
   receiving an input signal and metadata describing content of the input signal;
   applying a first encoding operation on the input signal using a first codec to generate a first encoded stream representing the input signal at a first level of quality;
   applying a second encoding operation on the input signal to generate a second encoded stream representing the input signal at a second level of quality, wherein:
     the second level of quality is a higher level of quality than the first level of quality,
     the first and second encoded streams are for combination at a decoder,
     the first and second encoding operations are encoding operations of a hierarchical coding scheme, and
     the second encoded stream is encoded separately and without reference to the first encoded stream such that the first encoded stream and the second encoded stream are independently decodable from one another; and
   exchanging information between the first encoding operation and the second encoding operation, wherein the information that is exchanged between the first encoding operation and the second encoding operation is exchanged via use of a pointer that points to a shared memory space storing the information that is to be exchanged; and
   reducing a size of the metadata, resulting in creation of sparsified metadata.

2. A method according to claim 1, the method further comprising adapting the first or second encoding operation or both based on the information.

3. A method according to claim 1, wherein the hierarchical coding scheme comprises:
   producing a base encoded signal by feeding an encoder with a down-sampled version of an input signal;
   producing a first residual signal by:
     obtaining a decoded version of the base encoded signal; and
     using a difference between the decoded version of the base encoded signal and the down-sampled version of the input signal to produce the first residual signal; and,
   encoding the first residual signal to produce a first encoded residual signal.

4. A method according to claim 3, further comprising:
   producing a second residual signal by:
     decoding the first encoded residual signal to produce a first decoded residual signal;
     correcting the decoded version of the base encoded signal using the first decoded residual signal to create a corrected decoded version;
     up-sampling the corrected decoded version; and
     using a difference between the up-sampled version and the input signal to produce the second residual signal; and
   encoding the second residual signal to produce a second encoded residual signal,
   wherein the base encoded signal, the first encoded residual signal and the second encoded residual signal comprise an encoding of the input signal.

5. A method according to claim 1, wherein the hierarchical coding scheme comprises:
producing a base encoded signal by feeding an encoder with a down-sampled version of an input signal, the down-sampled version having undergone one or more down-sampling operations;
producing one or more residual signals by:
up-sampling the output of each down-sampling operation to create one or more up-sampled signals; and
using a difference between each up-sampled signal and the input to the respective down-sampling operation to produce the one or more residual signals; and,
encoding the one or more residuals signals to produce one or more encoded residual signals.

6. A method according to claim 1, wherein the hierarchical coding scheme comprises:
producing a base encoded signal by feeding an encoder with a down-sampled version of an input signal, the down-sampled version having undergone a plurality of sequential down-sampling operations; and
producing an encoded first residual signal by:
up-sampling the down-sampled version of the input signal;
using a difference between the up-sampled version of the down-sampled version and the input to the last down-sampling operation of the plurality of sequential down-sampling operations to produce the first residual signal; and,
encoding the first residual signal;
producing a second residual signal by:
up-sampling a summation of the first residual signal and the output of a preceding down-sampling operation to the last down-sampling operation of the plurality of sequential down-sampling operations;
using a difference between the up-sampled summation and the input to the preceding down-sampling operation to produce the second residual signal; and,
encoding the second residual signal.

7. A method according to claim 1, wherein the step of exchanging information comprises sending information with metadata in a stream.

8. A method according to claim 1, wherein the step of exchanging information further comprises:
sending information using an Application Programming Interface (API); or
exchanging information using supplemental enhancement information (SEI).

9. A method according to claim 1, wherein the information exchanged comprises encoding parameters for modifying the encoding operation.

10. A method according to claim 1, wherein the information exchanged comprises one or more selected from a group comprising:
user input information;
host device information;
content analysis information;
perceptual information describing the areas of the image where coding artefacts will be less visible considering Human Visual System (HVS);
motion information;
complexity of the frame to be encoded;
frame entropy;
estimated required number of bits;
frame information;
decisions taken during encoding or decoding;
a type of prediction used for a frame to be decoded/encoded;
a quantisation level used for a frame to be decoded/encoded,
decisions made per group of pixels;
statistics information;
objective video quality metrics; and,
rate control information.

11. A method according to claim 1, wherein the signal is a video and wherein the step of exchanging information is performed on one or more of a per video, per group of pictures, per segment, per picture, per group of pixels and per pixel basis.

12. A method of decoding a signal, the method comprising:
receiving a first encoded signal and a second encoded signal;
receiving sparsified metadata, wherein the sparsified metadata relates to metadata associated with the signal, and wherein the sparsified metadata is metadata that has been reduced in size prior to transmission;
applying a first decoding operation to the first encoded signal to generate a first output signal representing the first encoded signal at a first level of quality;
applying a second decoding operation on the second encoded signal to generate a second output signal representing the second encoded signal at a second level of quality, wherein:
the second level of quality is a higher level of quality than the first level of quality,
the first and second decoding operations are decoding operations of a hierarchical coding scheme, and
the second output signal is decoded separately and without reference to the first output signal such that the first encoded stream and the second encoded stream are independently decodable from one another;
combining the first output signal and the second output signal to reconstruct an input signal; and
exchanging information between the first decoding operation and the second decoding operation, wherein the information that is exchanged between the first decoding operation and the second decoding operation is exchanged via use of a pointer that points to a shared memory space storing the information that is to be exchanged.

13. A method according to claim 12, the method further comprising adapting the first or second decoding operation or both based on the information.

14. A method according to claim 12, wherein the hierarchical coding scheme comprises:
receiving a base encoded signal and instructing a decoding of the base encoded signal to produce a base decoded signal;
receiving a first encoded residual signal and decoding the first encoded residual signal to produce a first decoded residual signal;
correcting the base decoded signal using the first decoded residual signal to produce a corrected version of the base decoded signal;
up-sampling the corrected version of the base decoded signal to produce an up-sampled signal;
receiving a second encoded residual signal and decoding the second encoded residual signal to produce a second decoded residual signal; and
combining the up-sampled signal with the second decoded residual signal to produce a reconstructed version of the input signal.

15. A method according to claim 12, wherein the first encoded signal and second encoded signal comprise first and second component sets respectively, the first component set corresponding to a lower image resolution than the second component set, the method comprising:
for each of the first and second component sets:
decoding the component set so as to obtain a decoded set,
the method further comprising:
upscaling the decoded first component set so as to increase the corresponding image resolution of the decoded first component set to be equal to the corresponding image resolution of the decoded second component set, and
combining the decoded first and second component sets together so as to produce a reconstructed set, wherein the method further comprises receiving one or more further component sets, wherein each of the one or more further component sets corresponds to a higher image resolution than the second component set, and wherein each of the one or more further component sets corresponds to a progressively higher image resolution, the method comprising, for each of the one or more further component sets, decoding the component set so as to obtain a decoded set, the method further comprising, for each of the one or more further component sets, in ascending order of corresponding image resolution:
upscaling the reconstructed set having the highest corresponding image resolution so as to increase the corresponding image resolution of the reconstructed set to be equal to the corresponding image resolution of the further component set, and
combining the reconstructed set and the further component set together so as to produce a further reconstructed set.

16. An encoding apparatus configured to:
receive an input signal and metadata describing content of the input signal;
apply a first encoding operation on the input signal using a first codec to generate a first encoded stream representing the input signal at a first level of quality;
apply a second encoding operation on the input signal to generate a second encoded stream representing the input signal at a second level of quality, the second level of quality being a higher level of quality than the first level of quality, wherein the first and second encoded streams are for combination at a decoder and the first and second encoding operations are encoding operations of a hierarchical coding scheme, and wherein the second encoded stream is encoded separately and without reference to the first encoded stream such that the first encoded stream and the second encoded stream are independently decodable from one another;
exchanging information between the first encoding operation and the second encoding operation, wherein the information that is exchanged between the first encoding operation and the second encoding operation is exchanged via use of a pointer that points to a shared memory space storing the information that is to be exchanged; and
reducing a size of the metadata, resulting in creation of sparsified metadata.

17. A decoding apparatus configured to:
receive a first encoded signal and a second encoded signal;
receive sparsified metadata, wherein the sparsified metadata relates to metadata associated with the signal, and wherein the sparsified metadata is metadata that has been reduced in size prior to transmission;
apply a first decoding operation to the first encoded signal to generate a first output signal representing the first encoded signal at a first level of quality;
apply a second decoding operation on the second encoded signal to generate a second output signal representing the second encoded signal at a second level of quality, the second level of quality being a higher level of quality than the first level of quality, wherein the first and second decoding operations are decoding operations of a hierarchical coding scheme, and wherein the second output signal is decoded separately and without reference to the first output signal such that the first encoded stream and the second encoded stream are independently decodable from one another;
combine the first output signal and the second output signal to reconstruct an input signal; and
exchanging information between the first decoding operation and the second decoding operation, wherein the information that is exchanged between the first decoding operation and the second decoding operation is exchanged via use of a pointer that points to a shared memory space storing the information that is to be exchanged.

* * * * *